United States Patent
Iwamura et al.

(10) Patent No.: US 8,665,833 B2
(45) Date of Patent: Mar. 4, 2014

(54) MOBILE COMMUNICATION METHOD AND MOBILE STATION

(75) Inventors: Mikio Iwamura, Tokyo (JP); Anil Umesh, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/505,476

(22) PCT Filed: Oct. 26, 2010

(86) PCT No.: PCT/JP2010/068951
§ 371 (c)(1),
(2), (4) Date: Jul. 5, 2012

(87) PCT Pub. No.: WO2011/052576
PCT Pub. Date: May 5, 2011

(65) Prior Publication Data
US 2012/0263064 A1    Oct. 18, 2012

(30) Foreign Application Priority Data
Nov. 2, 2009 (JP) .................................. 2009-252486
Jan. 8, 2010 (JP) .................................. 2010-003204

(51) Int. Cl.
*H04W 4/00* (2009.01)
*H04W 36/00* (2009.01)

(52) U.S. Cl.
USPC .......................................... 370/332; 455/436

(58) Field of Classification Search
None
See application file for complete search history.

(56) References Cited

U.S. PATENT DOCUMENTS

| | | | |
|---|---|---|---|
| 8,131,295 B2 * | 3/2012 | Wang et al. | 455/436 |
| 8,175,603 B1 * | 5/2012 | Hoole | 455/439 |
| 8,244,257 B2 * | 8/2012 | Walldeen et al. | 455/444 |
| 8,285,276 B2 * | 10/2012 | Lee et al. | 455/425 |
| 8,340,081 B2 * | 12/2012 | Salkintzis et al. | 370/352 |
| 8,433,317 B2 * | 4/2013 | Wu | 455/434 |
| 2008/0268845 A1 * | 10/2008 | Wu et al. | 455/436 |
| 2008/0293419 A1 * | 11/2008 | Somasundaram et al. | 455/437 |
| 2009/0092097 A1 * | 4/2009 | Nylander et al. | 370/331 |
| 2009/0109926 A1 | 4/2009 | Meylan | |
| 2009/0119564 A1 * | 5/2009 | Sagfors et al. | 714/748 |
| 2009/0137262 A1 * | 5/2009 | Willenegger et al. | 455/515 |
| 2009/0196253 A1 * | 8/2009 | Semper | 370/331 |

(Continued)

FOREIGN PATENT DOCUMENTS

| | | |
|---|---|---|
| JP | 2009-207108 A | 9/2009 |
| WO | 2006012909 A1 | 2/2006 |

OTHER PUBLICATIONS

Office Action for Chinese Application No. 201080049492.3, mailed Dec. 12, 2012, with English translations thereof (10 pages).

(Continued)

*Primary Examiner* — Faruk Hamza
*Assistant Examiner* — Andrew Oh
(74) *Attorney, Agent, or Firm* — Osha Liang LLP

(57) ABSTRACT

To appropriately transmit "entering/leaving proximity indication" while preventing the wastage of radio resources. A mobile station UE according to the present invention is configured not to transmit "entering proximity indication" even when an entry into a predetermined area #1 is detected, and not to transmit "leaving proximity indication" even when an exit from the predetermined area #1 is detected, when a predetermined period has not elapsed since the time of transmission of "entering proximity indication" or "leaving proximity indication".

16 Claims, 2 Drawing Sheets

(56) References Cited

U.S. PATENT DOCUMENTS

| | | | |
|---|---|---|---|
| 2009/0239533 A1* | 9/2009 | Somasundaram et al. | 455/434 |
| 2009/0253441 A1* | 10/2009 | Wallis | 455/456.3 |
| 2009/0264077 A1* | 10/2009 | Damnjanovic | 455/63.1 |
| 2009/0268683 A1* | 10/2009 | Ho et al. | 370/329 |
| 2010/0070814 A1* | 3/2010 | Damnjanovic et al. | 714/748 |
| 2010/0075670 A1* | 3/2010 | Wu | 455/434 |
| 2010/0093358 A1* | 4/2010 | Cheong et al. | 455/444 |
| 2010/0105334 A1* | 4/2010 | Terry et al. | 455/67.11 |
| 2010/0113020 A1* | 5/2010 | Subramanian et al. | 455/435.2 |
| 2010/0113070 A1* | 5/2010 | Nigam et al. | 455/458 |
| 2010/0178921 A1* | 7/2010 | Aqvist et al. | 455/436 |
| 2010/0238920 A1* | 9/2010 | Salkintzis et al. | 370/357 |
| 2010/0323627 A1* | 12/2010 | Alanara | 455/67.11 |
| 2010/0329193 A1* | 12/2010 | Bienas et al. | 370/329 |
| 2011/0009095 A1* | 1/2011 | Uemura et al. | 455/411 |
| 2011/0009147 A1* | 1/2011 | Morita et al. | 455/509 |
| 2011/0039546 A1* | 2/2011 | Narasimha et al. | 455/423 |
| 2011/0171962 A1* | 7/2011 | Iwamura et al. | 455/437 |
| 2011/0194424 A1* | 8/2011 | Jeong et al. | 370/252 |
| 2011/0201354 A1* | 8/2011 | Park et al. | 455/456.1 |
| 2011/0206011 A1* | 8/2011 | Ishida et al. | 370/331 |

OTHER PUBLICATIONS

Panasonic, "UE access control in CSG cell," 3GPP TSG RAN WG2 #62, R2-082238, May 5-9, 2008, 5 pages.

International Search Report issued in PCT/JP2010/068951, mailed on Feb. 1, 2011, with translation, 2 pages.

Extended European Search Report in corresponding European application No. 10826708.9 dated Jun. 3, 2013 (7 pages).

NTT Docomo, Inc.; "CSG inbound handover—proximity indication"; 3GPP TSG-RAN WG2 #67bis, Tdoc-R2-096019; Miyazaki, Japan; Oct. 12-16, 2009 (3 pages).

* cited by examiner

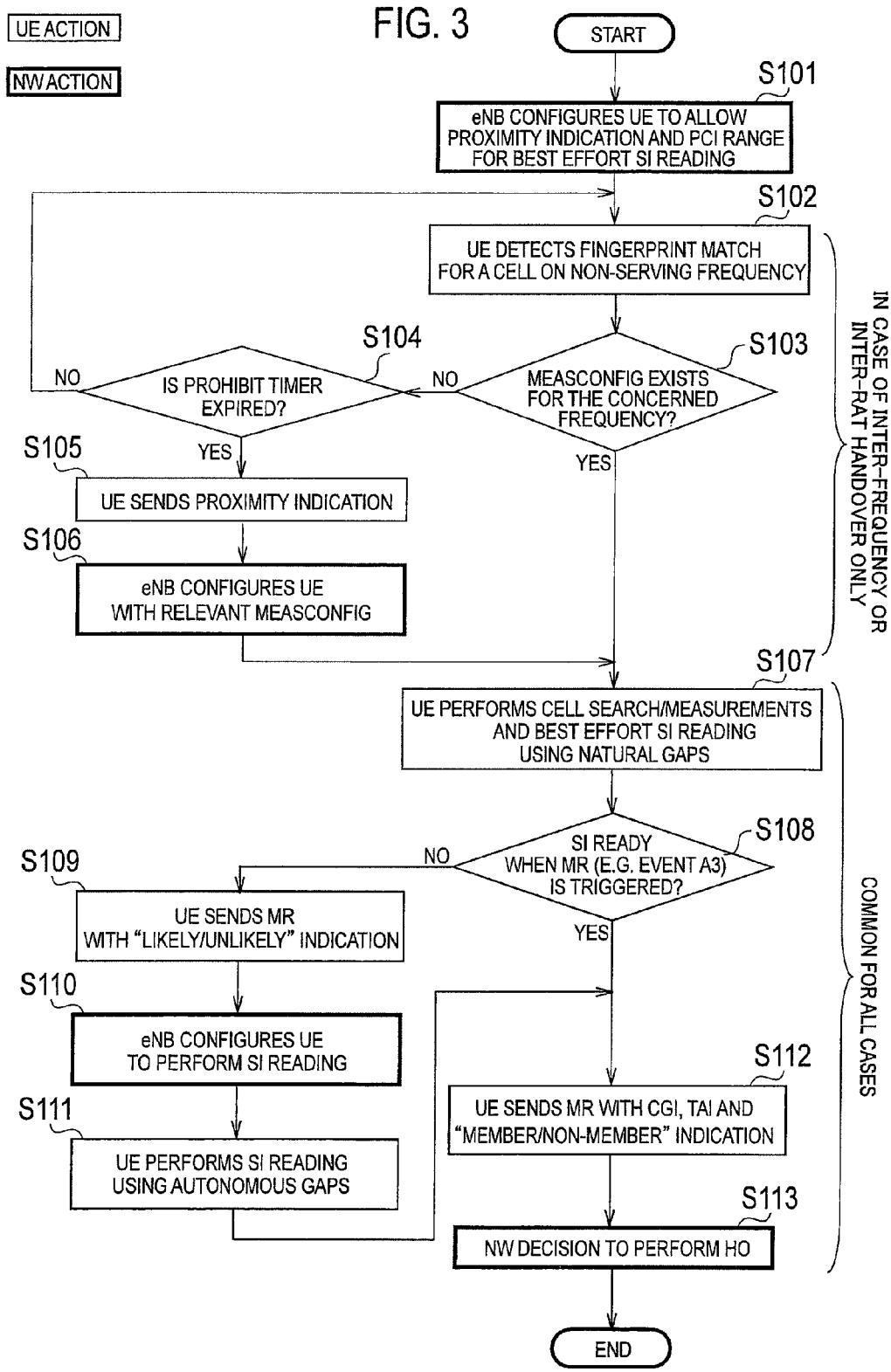

MOBILE COMMUNICATION METHOD AND MOBILE STATION

TECHNICAL FIELD

The present invention relates to a mobile communication method and a mobile station.

BACKGROUND ART

In a mobile communication system of an LTE (Long Term Evolution) scheme, configuration is such that when a mobile station UE communicating in a macro cell detects an entry into a predetermined area corresponding to a CSG (Closed Subscriber Group) cell managed as a fingerprint, the mobile station UE transmits "entering proximity indication" to a radio base station eNB managing the macro cell, and the radio base station eNB that receives the "entering proximity indication" transmits "MeasConfig" to the mobile station UE instructing the measurement of the radio quality in a CSG cell #1 of a frequency F2 in predetermined "measurement gap".

Furthermore, when the mobile station UE communicating in a macro cell detects an exit from a predetermined area managed as a fingerprint, the mobile station UE is configured to transmit "leaving proximity indication" to a radio base station eNB managing the macro cell, and the radio base station eNB that receives the "leaving proximity indication" is configured to transmit "MeasConfig" to the mobile station UE instructing an interruption of the measurement of the radio quality in a CSG cell #1 of a frequency F2 in predetermined "measurement gap".

Here, a CSG cell indicates a cell that can be accessed only by a particular mobile station UE, wherein the mobile station UE checks the broadcast information of each cell, and if the CSG ID included in the broadcast information is included in "allowed CSG list" stored in the mobile station UE, the mobile station UE determines that the mobile station UE belongs to the CSG, and if the same is not included, the mobile station UE determines that the mobile station UE does not belong to the CSG.

Furthermore, when "CSG indication" included in the broadcast information is "TRUE", only the mobile station UE belonging to the CSG becomes able to access, and when the "CSG indication" included in the broadcast information is "FALSE", the mobile station UE belonging to the CSG is given preferential access.

However, in the above-described mobile communication system, because the conditions for the transmission of the "entering proximity indication" and the "leaving proximity indication" by the mobile station UE are not stipulated clearly, the "entering proximity indication" or the "leaving proximity indication" is transmitted frequently by the mobile station UE, which may result in wastage of radio resources.

SUMMARY OF THE INVENTION

Thus, the present invention has been achieved in view of the above-described problem, and an object thereof is to provide a mobile communication method and a mobile station, by which it is possible to appropriately transmit "entering proximity indication" and "leaving proximity indication" while preventing the wastage of radio resources.

A first characteristic of the present embodiment is summarized in that a mobile communication method, comprising, a step A of transmitting first instruction information to a radio base station configured to manage a cell of a first frequency when a mobile station communicating in a cell of the first frequency detects an entry into a predetermined area corresponding to a particular cell using a second frequency, and a step B of transmitting second instruction information to the radio base station when the mobile station detects an exit from the predetermined area, in which in the step A, when a predetermined period has not elapsed since the time of transmission of the first instruction information or the second instruction information, the mobile station does not transmit the first instruction information even when the entry into the predetermined area is detected, and in the step B, when a predetermined period has not elapsed since the time of transmission of the first instruction information or the second instruction information, the mobile station does not transmit the second instruction information even when the exit from the predetermined area is detected.

A second characteristic of the present embodiment is summarized in that a mobile station, comprising a transmission unit configured to transmit first instruction information to a radio base station configured to manage a cell of a first frequency when an entry into a predetermined area corresponding to a particular cell using a second frequency is detected during communication in the cell of the first frequency, and to transmit second instruction information to the radio base station when an exit from the predetermined area is detected, in which the transmission unit is configured not to transmit the first instruction information, even when the entry into the predetermined area is detected, when a predetermined period has not elapsed since the time of transmission of the first instruction information or the second instruction information, and the transmission unit is configured not to transmit the second instruction information, even when the exit from the predetermined area is detected, when a predetermined period has not elapsed since the time of transmission of the first instruction information or the second instruction information.

BRIEF DESCRIPTION OF THE DRAWINGS

FIG. 3 is a flowchart showing an operation of the mobile communication system according to the first embodiment of the present invention.

BEST MODES FOR CARRYING OUT THE INVENTION

Configuration of Mobile Communication System According to First Embodiment of the Present Invention With reference to FIG. 1 and FIG. 2, the configuration of a mobile communication system according to the first embodiment of the present invention will be described.

Figure 1:
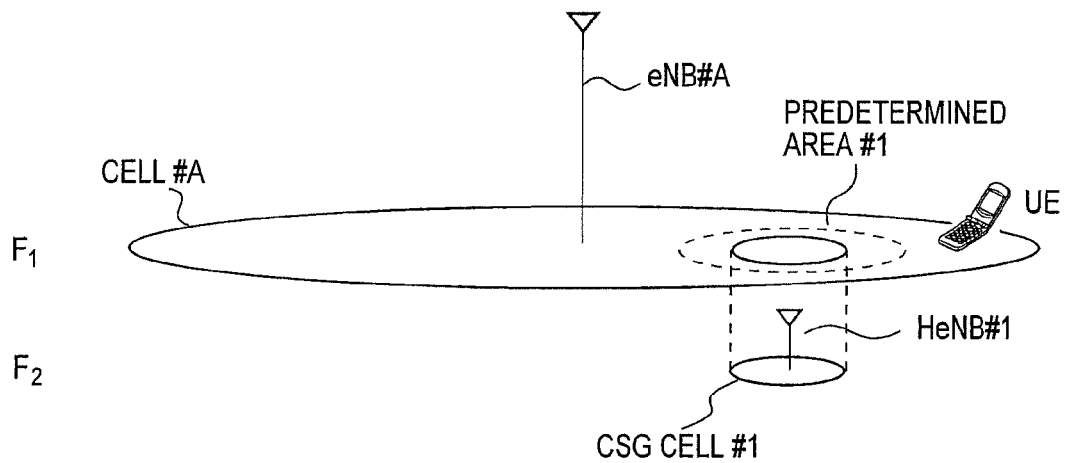
FIG. 1 is a diagram showing the entire configuration of a mobile communication system according to a first embodiment of the present invention.

The mobile communication system according to the present embodiment is a mobile communication system of the LTE scheme, and in the mobile communication system, as shown in FIG. 1, a cell #A of a frequency F1 that is managed by a radio base station eNB#A and a CSG cell #1 of a frequency F2 that is managed by a radio base station HeNB#1 are located. Here, the CSG cell #1 is located within the area of the cell #A.

Figure 2:
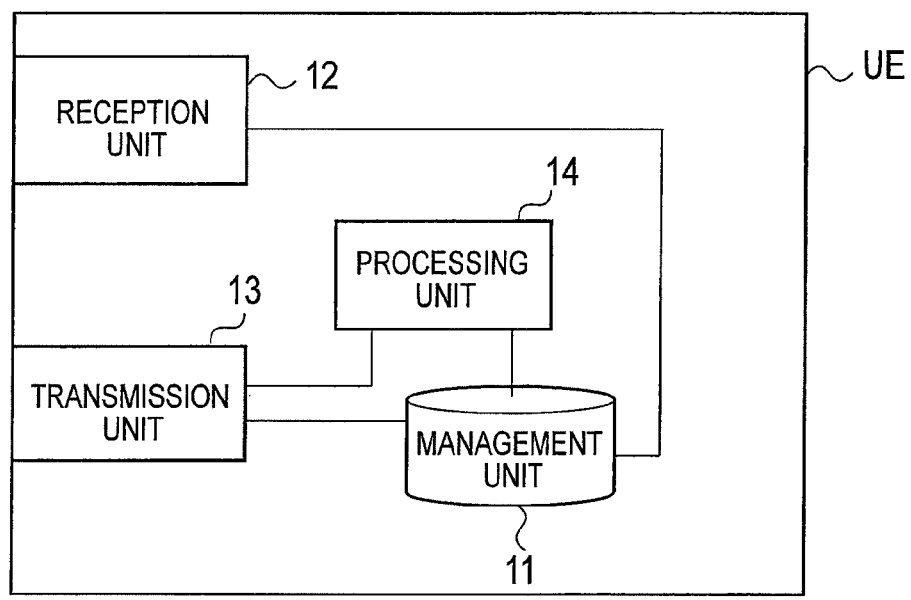
FIG. 2 is a functional block diagram of a mobile station UE according to the first embodiment of the present invention.

As shown in FIG. 2, the mobile station UE includes a management unit 11, a reception unit 12, a transmission unit 13, and a processing unit 14.

The management unit 11 is configured to manage a predetermined area corresponding to the frequency of a CSG cell for which the mobile station UE has the access permission. For example, in the present embodiment, the management unit 11 is configured to manage the predetermined area #1 corresponding to the frequency F2 of the CSG cell #1 for which the mobile station UE has the access permission.

The reception unit 12 is configured to receive a signal transmitted by the radio base station eNB, for example, "MeasConfig (measurement configuration)".

The transmission unit 13 is configured to transmit a signal to the radio base station eNB.

For example, the transmission unit 13 is configured to transmit "entering proximity indication (first instruction information)" to the radio base station eNB#A when an entry into the predetermined area #1 is detected during communication in the cell #A of the frequency F1.

However, the transmission unit 13 is configured not to transmit the "entering proximity indication" even when an entry into the predetermined area #1 is detected, when a predetermined period has not elapsed since the time of transmission of the "entering proximity indication" or "leaving proximity indication", that is, when "Prohibited Timer (predetermined timer)" has not expired.

Here, the "Prohibited Timer" is a timer that is activated when the "entering proximity indication" or the "leaving proximity indication" is transmitted by the transmission unit 13.

Furthermore, the transmission unit 13 is configured to transmit the "leaving proximity indication (second instruction information)" to the radio base station eNB#A when an exit from the predetermined area #1 is detected during communication in the cell #A of the frequency F1.

However, the transmission unit 13 is configured not to transmit the "leaving proximity indication" even when the exit from the predetermined area #1 is detected, when a predetermined period has not elapsed since the time of transmission of the "entering proximity indication" or the "leaving proximity indication", that is, when the "Prohibited Timer" has not expired.

Here, the predetermined area #1 may be a larger area than the CSG cell #1 or may be equal to the CSG cell #1 in size.

The predetermined area #1 (fingerprint) may be information stored, by the mobile station UE, regarding "neighboring environment" in which the CSG cell #1 exists, for example, the predetermined area #1 may be information based on the ID of the macro cell existing in the neighborhood, or the reception level of a signal from the macro cell, or the GPS information, or the predetermined area #1 may be a location registration area ID or PLMN ID, and it may be specific to implementation as to which information is used.

The processing unit 14 is configured to perform cell search in the frequency F2 in predetermined "Measurement gap (measurement interval)", and when the CSG cell #1 is detected, to measure the radio quality of the CSG cell #1, when the "MeasConfig (measurement configuration)" including the predetermined "Measurement gap" is received from the radio base station eNB#A.

Note that the processing unit 14 is configured to interrupt the cell search and the measurement of the radio quality, when the "MeasConfig" instructing the interruption of the measurement of the radio quality in the CSG cell #1 of the frequency F2 in the predetermined "measurement gap" is received from the radio base station eNB#A.

Operation of the Mobile Communication System According to the First Embodiment of the Present Invention An operation of the mobile communication system according to the first embodiment of the present invention is explained with reference to FIG. 3.

As shown in FIG. 3, in step S101, a radio access network E-UTRAN, that is, the radio base station eNB#A, uses individual signaling to allow the transmission of the "entering/leaving proximity indication".

Furthermore, in step S101, the radio base station eNB#A notifies the range of PCI (Physical Cell Identity) in which the SI (System Information) should be received.

In step S102, the mobile station UE detects an entry into a predetermined area (CSG cell) corresponding to the CSG cell that is managed as a fingerprint, or an exit from the predetermined area. Here, the frequency F2 of the CSG cell is assumed to be a non-serving frequency.

In step S103, the mobile station UE determines whether or not the "MeasConfig" about the frequency F2 is being managed.

If "YES", the operation proceeds to step S107, and If "NO", the operation proceeds to step S104.

In step S104, the mobile station UE determines whether or not the "Prohibited Timer" is being activated.

If "YES", the operation returns to step S102, and If "NO", the operation proceeds to step S105.

In step S105, the mobile station UE transmits "entering/leaving proximity indication" to the radio base station eNB#A.

At this time, the mobile station UE transmits the "entering/leaving proximity indication" while including therein the frequency F2 of the CSG cell #1. Furthermore, the mobile station UE may transmit the same while including therein a radio access technology (RAT) of the CSG cell #1.

In step S106, the radio base station eNB#A transmits the "MeasConfig" about the frequency F2 to the mobile station UE.

In step S107, the mobile station UE measures the radio quality in the CSG cell #1 of the frequency F2 in the "Measurement gap" included in the received "MeasConfig" about the frequency F2, and then performs various processes, such as a cell search process, a measurement process, and an SI reception (SI reading) process, for the CSG cell #1.

In step S108, the mobile station UE determines whether or not the SI reception is successful when the conditions for transmitting the "Measurement Report" (for example Event A3) are satisfied.

If "YES", the operation proceeds to step S112, and If "NO", the operation proceeds to step S109.

In step S109, the mobile station UE transmits the "Measurement Report" including "likely/unlikely indication" showing whether or not the mobile station UE has the access permission for the CSG cell #1, to the radio base station eNB#A.

When the mobile station UE infers that the cell corresponding to the PCI reported in the "Measurement Report" is a CSG cell to which the mobile station UE belongs, the mobile station UE reports "likely", and when the mobile station UE infers that the cell is a CSG cell to which the mobile station UE does not belong, the mobile station UE reports "unlikely".

The mobile station UE can also store the PCI information of the CSG cell as "fingerprint" information, and can infer the "likely/unlikely" based thereon.

In step S110, the radio base station eNB#A notifies the mobile station UE of the configuration for performing the SI reception process.

In step S111, the mobile station UE performs the SI reception process based on the "gap" notified from the radio base station eNB#A.

In step S112, the mobile station UE transmits the "Measurement Report" including "member/non-member indication" showing the results of CGI (Cell Global Identity), TAT (Tracking Area Identity), and "Preliminary access check" for the CSG cell #1, to the radio base station eNB#A.

From the CSG ID included in the received broadcast information, the mobile station UE determines whether or not the mobile station UE belongs to the CSG of the cell, and if the mobile station UE belongs to the CSG of the cell, the mobile station UE reports "member" and if the mobile station UE does not belong to the CSG of the cell, the mobile station UE reports "non-member".

In step S113, the radio access network E-UTRAN determines whether or not the handover process of the mobile station UE should be performed based on the "Measurement Report".

Operation and Effect of the Mobile Communication System According to the First Embodiment of the Present Invention According to the mobile communication system of the first embodiment of the present invention, the mobile station UE is configured not to transmit the "entering proximity indication" even when the entry into the predetermined area #1 is detected, and not to transmit the "leaving proximity indication" even when the exit from the predetermined area #1 is detected, when a predetermined period has not elapsed since the time of transmission of the "entering proximity indication" or the "leaving proximity indication", that is, when the "Prohibited Timer" has not expired. Thus, it is possible to resolve the problem of frequent transmission of the "entering/leaving proximity indication" by the mobile station UE and wastage of radio resources.

Furthermore, because the radio base station eNB performs measurement control "MeasConfig" in accordance with the received "entering/leaving proximity indication", frequent measurement control can be avoided.

First Modification

The following is a description of a mobile communication system according to a first modification while focusing on the difference from the mobile communication system according to the first embodiment described above.

In the mobile communication system according to the first modification, the transmission unit 13 of the mobile station UE may be configured to transmit the "entering proximity indication" including the PCI of the CSG cell #1 to the radio base station eNB#A when the entry into the predetermined area #1 is detected during communication in the cell #A of the first frequency F1.

However, the transmission unit 13 may be configured not to transmit the "entering proximity indication" relating to the same RAT and frequency, when a predetermined period has not elapsed since the time of transmission of the "entering proximity indication" or the "leaving proximity indication", that is, when the "Prohibited Timer (predetermined timer)" has not expired.

Furthermore, the transmission unit 13 of the mobile station UE may be configured to transmit the "leaving proximity indication" including the PCI of the CSG cell #1 to the radio base station eNB#A when the exit from the predetermined area #1 is detected during communication in cell #A of the first frequency F1.

However, the transmission unit 13 may be configured not to transmit the "leaving proximity indication" relating to the same RAT and frequency, when a predetermined period has not elapsed since the time of transmission of the "entering proximity indication" or the "leaving proximity indication", that is, when the "Prohibited Timer (predetermined timer)" has not expired.

According to the mobile communication system of the first modification, the mobile station UE is configured to transmit, to the radio base station eNB#1, the "entering proximity indication" and the "leaving proximity indication" including the PCI of the CSG cell #1 for which the access permission is available, and therefore, it is possible to prevent the radio base station eNB#A from transmitting "SI reporting request" requesting the transmission of "SI reporting" for the CSG cell for which the mobile station UE does not have an access permission.

In the mobile communication system of the LTE scheme, in an inbound handover procedure to a CSG cell, the mobile station UE is configured to receive the broadcast information transmitted in the handover destination cell (Target Cell), and to transmit, to the radio base station S-eNB that is currently performing communications, "member/non-member indication" showing whether or not the mobile station UE belongs to the "CGI" of the handover destination cell, or the "TAI" of the handover destination cell, or the "CSG ID" broadcasted by the handover destination cell.

Such an operation is called "SI (System Information) reporting", and the signal for which the radio base station eNB#A requests the mobile station UE to execute the "SI reporting" is called "SI reporting request".

The characteristics of the present embodiment as described above may be expressed as follows.

A first characteristic of the present embodiment is summarized as a mobile communication method including: a step A of transmitting "entering proximity indication (first instruction information)" to a radio base station eNB#A that manages a cell #A of a frequency F1 (first frequency) when a mobile station UE communicating in the cell #A of the frequency F1 detects an entry into a predetermined area #1 corresponding to a CSG cell #1 (particular cell) using a frequency F2 (second frequency); a step B of transmitting "MeasConfig (measurement configuration)" instructing the measurement of the radio quality in the CSG cell #1 of the frequency F2 at predetermined "measurement gap (predetermined measurement interval)" to the mobile station UE when the radio base station eNB#A receives the "entering proximity indication"; a step C of transmitting "leaving proximity indication (second instruction information)" to the radio base station eNB#A when the mobile station UE detects an exit from the predetermined area #1; and a step D of transmitting "MeasConfig" instructing the interruption of measurement of the radio quality in the CSG cell #1 of the frequency F2 in the predetermined "measurement gap" to the mobile station UE when the radio base station eNB#A receives the "leaving proximity indication", wherein in the step A, when a predetermined period has not elapsed since the time of transmission of the "entering proximity indication" or the "leaving proximity indication", that is, when "Prohibited Timer" has not expired, the mobile station UE does not transmit the "entering proximity indication" even when an entry into the predetermined area #1 is detected, and in the step C, when a predetermined period has not elapsed since the time of transmission of the "entering proximity indication" or the "leaving proximity indication", that is, when the "Prohibited Timer" has not expired, the mobile station UE does not transmit the "leaving proximity indication" even when an exit from the predetermined area #1 is detected.

In the first characteristic of the present embodiment, the predetermined period may be a fixed value, or may be a value notified by the radio base station eNB#A via the broadcast information or individual signaling.

In the first characteristic of the present embodiment, in the step A, the mobile station UE may further transmit "entering proximity indication" to the radio base station eNB#A when the mobile station UE does not possess the "MeasConfig" about the frequency F2.

In the first characteristic of the present embodiment, in the step C, the mobile station UE may further transmit the "leaving proximity indication" to the radio base station eNB#A when the mobile station UE possesses the "MeasConfig" about the frequency F2.

In the first characteristic of the present embodiment, in the step A, upon detection of the entry into the predetermined area #1, the mobile station UE may transmit, to the radio base station eNB#A, the "entering proximity indication" including PCI (cell identification information) used in a scrambling process for a Primary-SCH signal and a Secondary-SCH signal (synchronous signals) that are broadcast in the CSG cell #1.

In the first characteristic of the present embodiment, in the step C, upon detection of the exit from the predetermined area #1, the mobile station UE may transmit the "leaving proximity indication" including the PCI of the CSG cell #1 to the radio base station eNB#A.

A second characteristic of the present embodiment is summarized as a mobile station UE comprising a transmission unit 13 configured to transmit "entering proximity indication" to a radio base station eNB#A configured to manage a cell #A of a frequency F1 when an entry into a predetermined area #1 is detected during communication in the cell #A of the frequency F1, and to transmit "leaving proximity indication" to the radio base station eNB#A when an exit from the predetermined area #1 is detected, wherein the transmission unit 13 is configured not to transmit the "entering proximity indication" even when the entry into the predetermined area #1 is detected, when a predetermined period has not elapsed since the time of transmission of the "entering proximity indication" or the "leaving proximity indication", that is, when "Prohibited Timer" has not expired, and the transmission unit 13 is configured not to transmit the "leaving proximity indication" even when the exit from the predetermined area #1 is detected, when a predetermined period has not elapsed since the time of transmission of the "entering proximity indication" or the "leaving proximity indication", that is, when the "Prohibited Timer" has not expired.

In the second characteristic of the present embodiment, the predetermined period may be a fixed value, or may be a value notified by the radio base station eNB#A via the broadcast information or individual signaling.

In the second characteristic of the present embodiment, in a case of not possessing the "MeasConfig" about frequency F2, the transmission unit 13 may further be configured to transmit the "entering proximity indication" to the radio base station eNB#A.

In the second characteristic of the present embodiment, in a case of possessing the "MeasConfig" about the frequency F2, the transmission unit 13 may be further configured to transmit the "leaving proximity indication" to the radio base station eNB#A.

In the second characteristic of the present embodiment, the transmission unit 13 may be configured to transmit the "entering proximity indication" including the PCI of the CSG cell #1 to the radio base station eNB#A when the entry into the predetermined area #1 is detected during communication in the cell #A of the first frequency F1.

In the second characteristic of the present embodiment, the transmission unit 13 may be configured to transmit the "leaving proximity indication" including the PCI of the CSG cell #1 to the radio base station eNB#A when the exit from the predetermined area #1 is detected during communication in the cell #A of the first frequency F1.

In addition, the operation of the above-mentioned the radio base station eNB/HeNB or the mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the radio base station eNB/HeNB or the mobile station UE. As a discrete component, such storage medium and processor may be arranged in the radio base station eNB/HeNB or the mobile station UE.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication method and a mobile station, by which it is possible to appropriately transmit "entering proximity indication" and "leaving proximity indication" while preventing the wastage of radio resources.

The invention claimed is:

1. A mobile communication method, comprising:
   a step A of transmitting first instruction information to a radio base station configured to manage a cell of a first frequency when a mobile station communicating in a cell of the first frequency detects an entry into a predetermined area corresponding to a particular cell using a second frequency; and
   a step B of transmitting second instruction information to the radio base station when the mobile station detects an exit from the predetermined area;
   a step of the radio base station transmitting, when receiving the first instruction information, a measurement configuration instructing the measurement of a radio quality in a cell of the second frequency to the mobile station; and a step of the radio base station transmitting, when receiving the second instruction information, a measurement configuration instructing an interruption of measurement of the radio quality in the cell of the second frequency to the mobile station, wherein in the step A, when a predetermined period has not elapsed since the time of transmission of the first instruction information or the second instruction information, the mobile station does not transmit the first instruction information even when the entry into the predetermined area is detected, and in the step B, when a predetermined period has not elapsed since the time of transmission of the first instruction information or the second instruction information, the mobile station does not transmit the second instruction information even when the exit from the predetermined area is detected.

2. The mobile communication method according to claim 1, wherein the predetermined period is a fixed value.

3. The mobile communication method according to claim 1, wherein the predetermined period is a value notified by the radio base station.

4. The mobile communication method according to claim 1, wherein in the step A, the mobile station further transmits the first instruction information to the radio base station when the mobile station does not possess a measurement configuration about the second frequency.

5. The mobile communication method according to claim 1, wherein in the step B, the mobile station further transmits the second instruction information to the radio base station when the mobile station possesses a measurement configuration about the second frequency.

6. The mobile communication method according to claim 1, wherein in the step A, the mobile station transmits, to the radio base station, the first instruction information including cell identification information used in a scrambling process for synchronous signals broadcast in a particular cell, when the entry into the predetermined area is detected.

7. The mobile communication method according to claim 6, wherein in the step B, the mobile station transmits, to the radio base station, the second instruction information including cell identification information used in the scrambling process for the synchronous signals broadcast in the particular cell, when the exit from the predetermined area is detected.

8. The mobile communication method according to claim 1, wherein in the step B, the mobile station transmits, to the radio base station, the second instruction information including cell identification information used in the scrambling process for the synchronous signals broadcast in the particular cell, when the exit from the predetermined area is detected.

9. A mobile station, comprising:

a transmission unit configured to transmit first instruction information to a radio base station configured to manage a cell of a first frequency when an entry into a predetermined area corresponding to a particular cell using a second frequency is detected during communication in the cell of the first frequency, and to transmit second instruction information to the radio base station when an exit from the predetermined area is detected;

a step of the radio base station transmitting, when receiving the first instruction information, a measurement configuration instructing the measurement of a radio quality in a cell of the second frequency to the mobile station; and a step of the radio base station transmitting, when receiving the second instruction information a measurement configuration instructing an interruption of measurement of the radio quality in the cell of the second frequency to the mobile station, wherein the transmission unit is configured not to transmit the first instruction information, even when the entry into the predetermined area is detected, when a predetermined period has not elapsed since the time of transmission of the first instruction information or the second instruction information, and the transmission unit is configured not to transmit the second instruction information, even when the exit from the predetermined area is detected, when a predetermined period has not elapsed since the time of transmission of the first instruction information or the second instruction information.

10. The mobile station according to claim 9, wherein the predetermined period is a fixed value.

11. The mobile station according to claim 9, wherein the predetermined period is a value notified by the radio base station.

12. The mobile station according to claim 9, wherein the transmission unit is further configured to transmit the first instruction information to the radio base station when the mobile station does not possess a measurement configuration about the second frequency.

13. The mobile station according to claim 9, wherein the transmission unit is further configured to transmit the second instruction information to the radio base station when the mobile station possesses a measurement configuration about the second frequency.

14. The mobile station according to claim 9, wherein the transmission unit is configured to transmit, to the radio base station, the first instruction information including cell identification information used in a scrambling process for synchronous signals broadcast in a particular cell, when the entry into the predetermined area is detected during communication in a cell of the first frequency.

15. The mobile station according to claim 14, wherein the transmission unit is configured to transmit, to the radio base station, the second instruction information including cell identification information used in the scrambling process for the synchronous signals broadcast in the particular cell, when an exit from the predetermined area is detected during communication in a cell of the first frequency.

16. The mobile station according to claim 9, wherein the transmission unit is configured to transmit, to the radio base station, the second instruction information including cell identification information used in the scrambling process for the synchronous signals broadcast in the particular cell, when an exit from the predetermined area is detected during communication in a cell of the first frequency.

* * * * *